(12) United States Patent
Kothari et al.

(10) Patent No.: US 10,642,050 B1
(45) Date of Patent: May 5, 2020

(54) MODULAR ACCESSORY SYSTEMS FOR WEARABLE DEVICES

(71) Applicant: GOOGLE LLC, Mountain View, CA (US)

(72) Inventors: Jay Kothari, San Francisco, CA (US); Christopher Hoover, Mountain View, CA (US); Raymond Gradwohl, Saratoga, CA (US); Kenneth Robertson, San Jose, CA (US); Melvin Chua, Danville, CA (US); John Stivoric, Pittsburgh, PA (US); Zoey Zweber, Mountain View, CA (US); Jacques Gagne, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/220,735

(22) Filed: Dec. 14, 2018

(51) Int. Cl.
*G02B 27/01* (2006.01)
*H04N 5/225* (2006.01)

(52) U.S. Cl.
CPC ....... *G02B 27/0176* (2013.01); *H04N 5/2252* (2013.01); *H04N 5/225251* (2018.08); *G02B 2027/0156* (2013.01); *G02B 2027/0161* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 4,798,454 A | * | 1/1989 | Hyun | G02C 7/14 351/158 |
| 8,878,749 B1 | * | 11/2014 | Wu | G01S 17/06 345/8 |
| 8,957,916 B1 | * | 2/2015 | Hedman | G09G 3/003 345/633 |
| 9,961,307 B1 | * | 5/2018 | Weinblatt | H04N 7/183 |
| 2005/0259218 A1 | * | 11/2005 | Habermann | G02C 1/08 351/41 |
| 2007/0121060 A1 | * | 5/2007 | Habermann | G02C 1/08 351/113 |
| 2008/0198324 A1 | * | 8/2008 | Fuziak | G02B 27/0172 351/158 |
| 2009/0251661 A1 | * | 10/2009 | Fuziak, Jr. | G02B 27/0172 351/158 |
| 2010/0079356 A1 | * | 4/2010 | Hoellwarth | G02B 27/017 345/8 |

(Continued)

*Primary Examiner* — David D Davis
(74) *Attorney, Agent, or Firm* — McDonnell Boehnen Hulbert & Berghoff LLP

(57) ABSTRACT

Systems and devices are disclosed herein that provide or relate to modular accessory devices for a wearable device, such as a glasses-style head-mountable device (HMD). Illustrative systems may include a first frame component having an accessory slot accessible via an entry point on a transverse surface of the first frame component, a second frame component movably coupled to the first frame component, and one or more accessory devices that each have a slot-mating feature shaped for insertion into and removal from the accessory slot via the entry point. The second frame component may be movable between a first position in which the second frame component blocks access to the entry point, and a second position in which the second frame component allows access to the entry point.

18 Claims, 10 Drawing Sheets

(56) References Cited

U.S. PATENT DOCUMENTS

| | | | |
|---|---|---|---|
| 2010/0309426 A1* | 12/2010 | Howell | G02C 5/143 |
| | | | 351/158 |
| 2011/0012814 A1* | 1/2011 | Tanaka | G02B 27/0176 |
| | | | 345/8 |
| 2012/0069448 A1* | 3/2012 | Sugihara | G02B 27/0176 |
| | | | 359/643 |
| 2012/0081658 A1* | 4/2012 | Sugihara | G02B 27/0176 |
| | | | 351/158 |
| 2012/0263449 A1* | 10/2012 | Bond | G03B 17/48 |
| | | | 396/420 |
| 2014/0232981 A1* | 8/2014 | Sugihara | G02B 27/017 |
| | | | 351/158 |
| 2015/0070596 A1* | 3/2015 | Gadjali | G02B 27/0172 |
| | | | 349/11 |
| 2015/0103304 A1* | 4/2015 | Darcy | G02C 1/06 |
| | | | 351/52 |
| 2015/0109571 A1* | 4/2015 | Gardaz | G02C 5/146 |
| | | | 351/52 |
| 2016/0033772 A1* | 2/2016 | Han | H04N 1/6083 |
| | | | 359/630 |
| 2017/0068115 A1* | 3/2017 | Aquino | G02C 11/02 |
| 2017/0168321 A1* | 6/2017 | Kawamoto | G02C 1/04 |
| 2017/0223236 A1* | 8/2017 | Oberlander | H04N 5/2252 |
| 2018/0267301 A1* | 9/2018 | Holst | H04N 7/185 |

* cited by examiner

MODULAR ACCESSORY SYSTEMS FOR WEARABLE DEVICES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

In one aspect, a system includes a first frame component of a head-wearable device, wherein the first frame component comprises an outer surface having an accessory slot, wherein the accessory slot is accessible via an entry point on a transverse surface of the first frame component; a second frame component of the head-wearable device; a hinge coupling the first frame component to the second frame component; and an accessory device comprising a slot-mating feature shaped for insertion into and removal from the accessory slot via the entry point, wherein the hinge is operable to move the second frame component between a first position in which the second frame component blocks access to the entry point, and a second position in which the second frame component allows access to the entry point.

In another aspect an apparatus includes a first frame component of a head-wearable device, wherein the first frame component an outer surface having an accessory slot, wherein the accessory slot is accessible via an entry point on a transverse surface of the first frame component; a second frame component movably coupled to the first frame component, wherein the accessory slot is shaped to allow for insertion of a slot-mating feature of an accessory device via the entry point on the transverse surface, such that insertion of the slot mating feature movably couples the accessory device to the first frame component, and wherein the hinge is operable to move the second frame component between a first position in which the second frame component blocks access to the entry point, and a second position in which the second frame component allows access to the entry point.

These as well as other aspects, advantages, and alternatives will become apparent to those of ordinary skill in the art by reading the following detailed description, with reference where appropriate to the accompanying drawings.

DETAILED DESCRIPTION

Figure 1A:
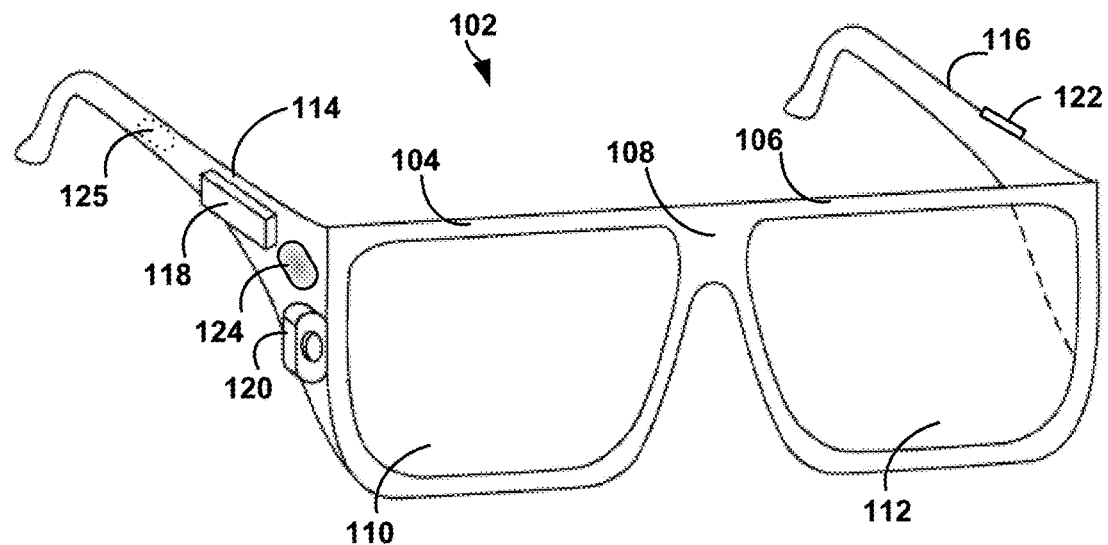
FIG. 1A illustrates an example of a wearable computing system.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example embodiments relate to and/or provide modular accessory systems for wearable devices, such as head-mountable devices (HMDs). In particular, a glasses-style HMD frame may have a front portion with foldable side-arms attached thereto. The front portion of the HMD frame can position a display in front of the wearer's eye. Further, the front of the HMD frame may have a curvature that follows the shape of the face, curving from the eye around towards the temple, where it is coupled to the side arm with, e.g., a hinge.

The front portion of the HMD frame may include an accessory slot, which is designed to accept corresponding slot-mating features on accessory devices, such as a sliding camera cover. The accessory slot may run along the outer surface of the front portion of an HMD frame. Further, an entry point for insertion and removal of accessory devices to and from the accessory slot may be located on a surface that is transverse to the surface on which the slot is disposed. For example, the entry point for the accessory slot may be on the rear surface of the front component of the frame, such that the entry point is adjacent to and hidden by the side-arm, when the side-arm is unfolded (e.g., so that the glasses-style HMD can be worn).

Further, the accessory slot and an accessory device's corresponding slot-mating feature may be configured such that removal of the accessory device from the slot is only possible via the entry point. Since the entry point is only accessible when the side-arm is folded (e.g., for storage of the HMD frame), the accessory device may be secured to the HMD frame when the frame is being worn (and thus unfolded).

In some embodiments, a camera cover having a slot-mating feature may be provided as an accessory device for an HMD's accessory slot. The camera cover may be configured such that a user can move the camera cover between two ends of the accessory slot to cover and uncover a camera lens disposed in the HMD frame.

The camera cover may include a rigid inner component with the slot-mating feature, and a flexible outer component that is coupled to and extends past the rigid inner component. The flexible outer component may be molded from a low compression-set elastomer or another flexible material. As such, the flexible outer component may be curved to conform to the HMD frame when the wearer pushes the camera cover to the rear of the accessory slot to reveal the camera. Correspondingly, the flexible outer component is configured to return to a smaller-radius curvature that follows the corresponding curvature of the first frame component, when the camera cover is pushed towards the front of the accessory slot to cover the HMD's camera.

In another aspect, the design of the accessory slot may allow users to swap in and out different types of accessory devices using the same accessory slot (e.g., by removing one accessory device and replacing it with another). Examples of accessory devices include the aforementioned camera cover, a laser scanner, a camera flash, and/or a video light, among other possibilities.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
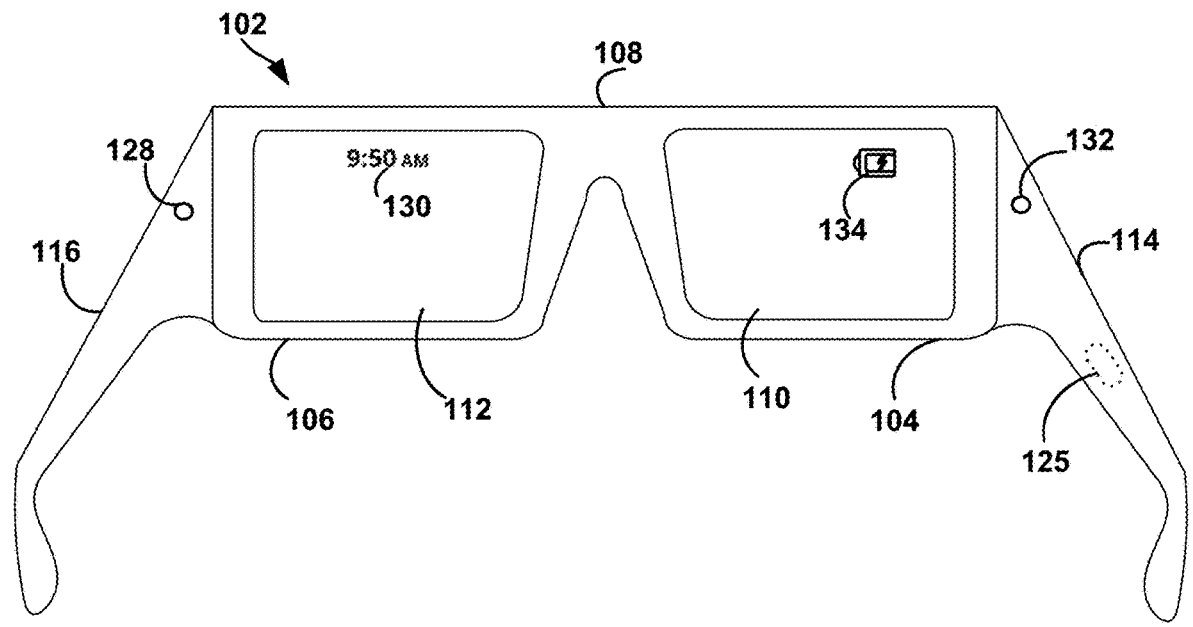
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
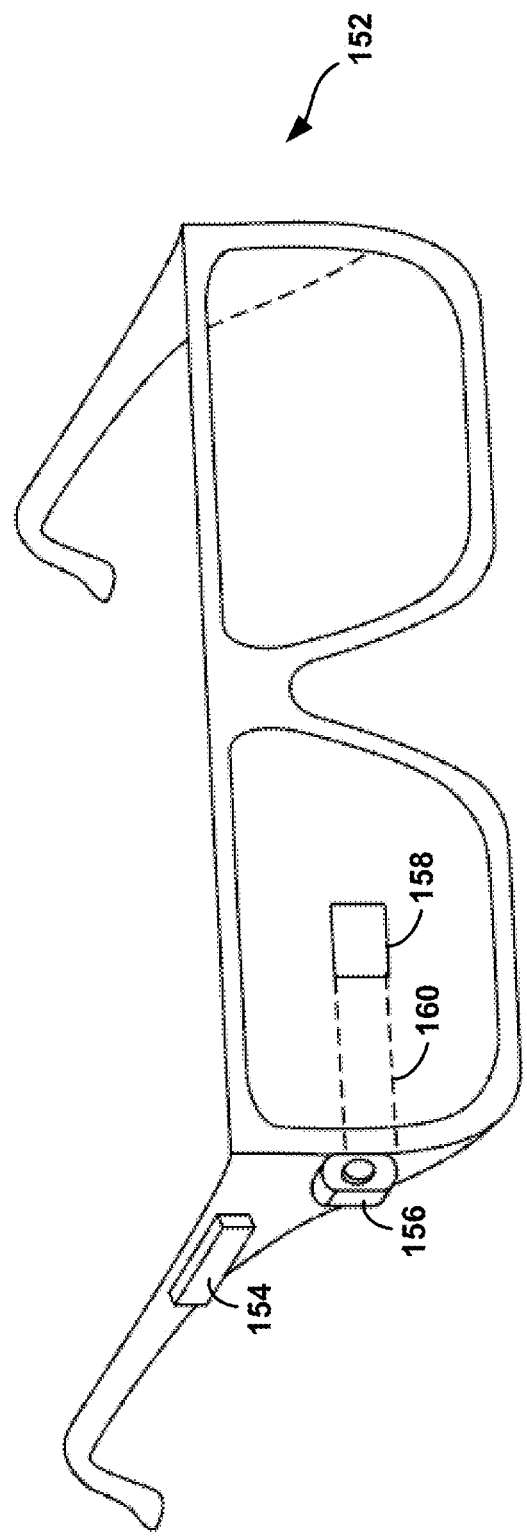
FIG. 1C illustrates another example of a wearable computing system.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
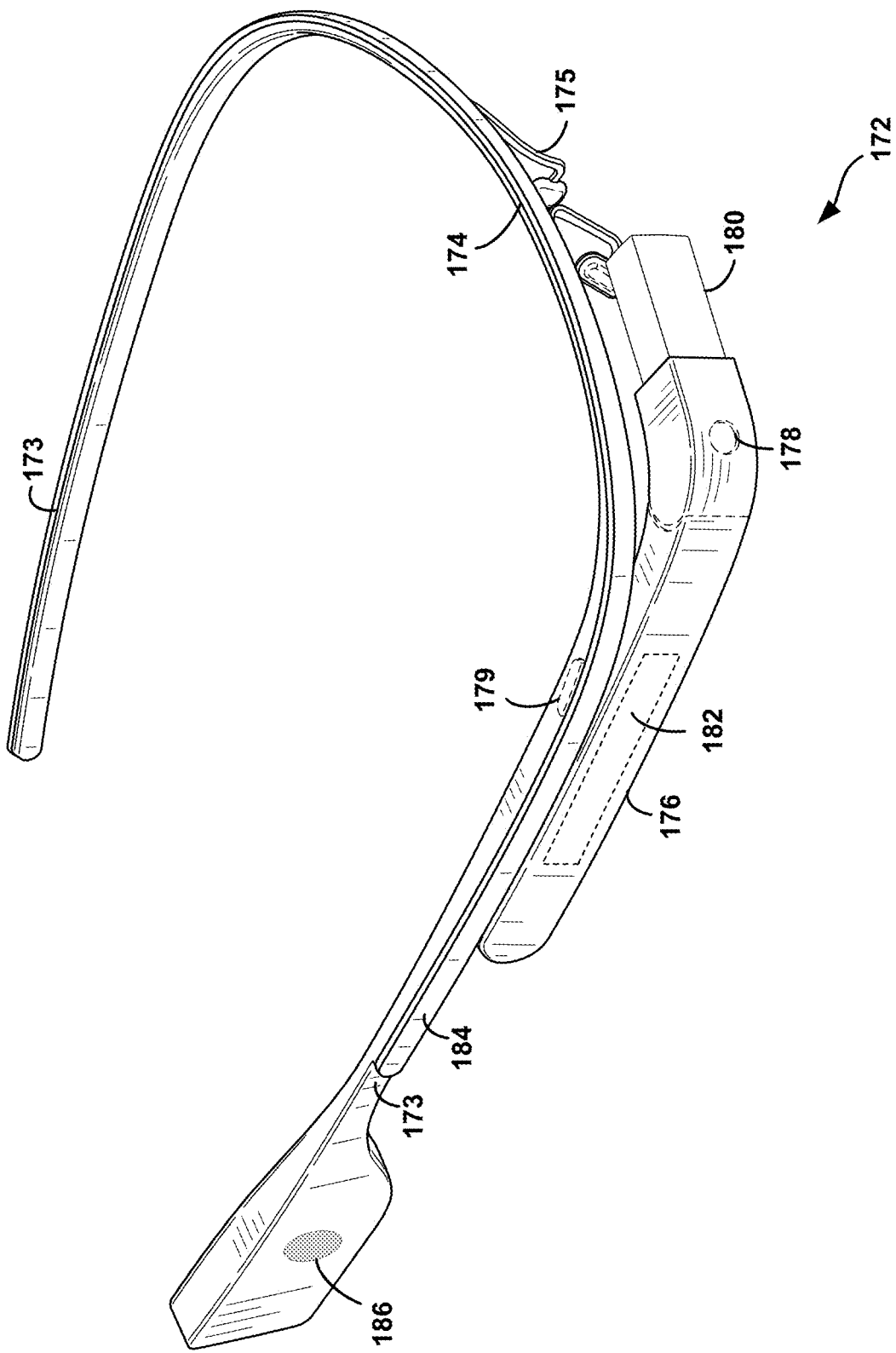
FIG. 1D illustrates another example of a wearable computing system.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. (Embodiments with a second display for the other eye are also possible.) In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
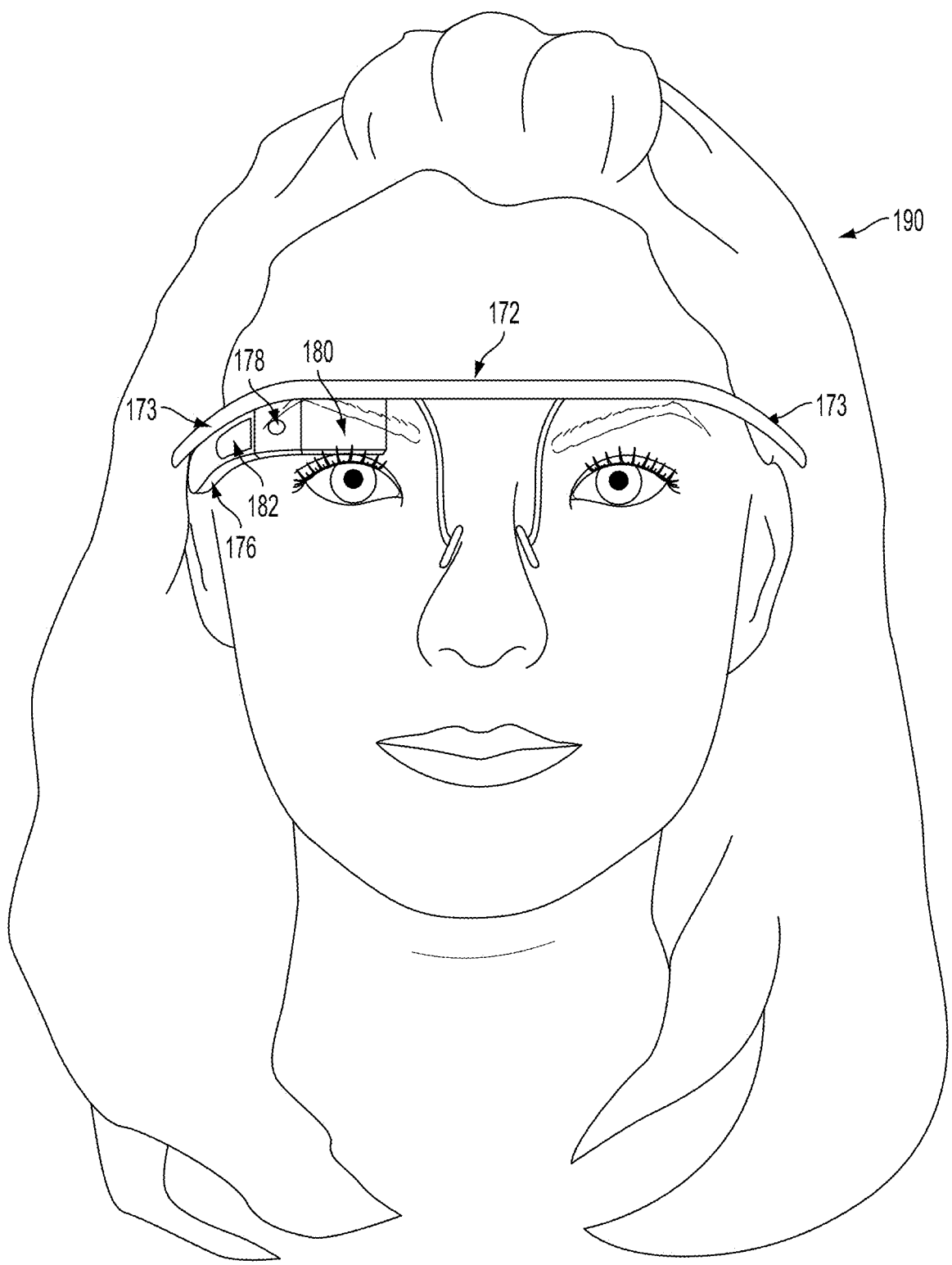
FIGS. 1E to 1G are simplified illustrations of the wearable computing system shown in FIG. 1D, being worn by a wearer.
Figure 1F:
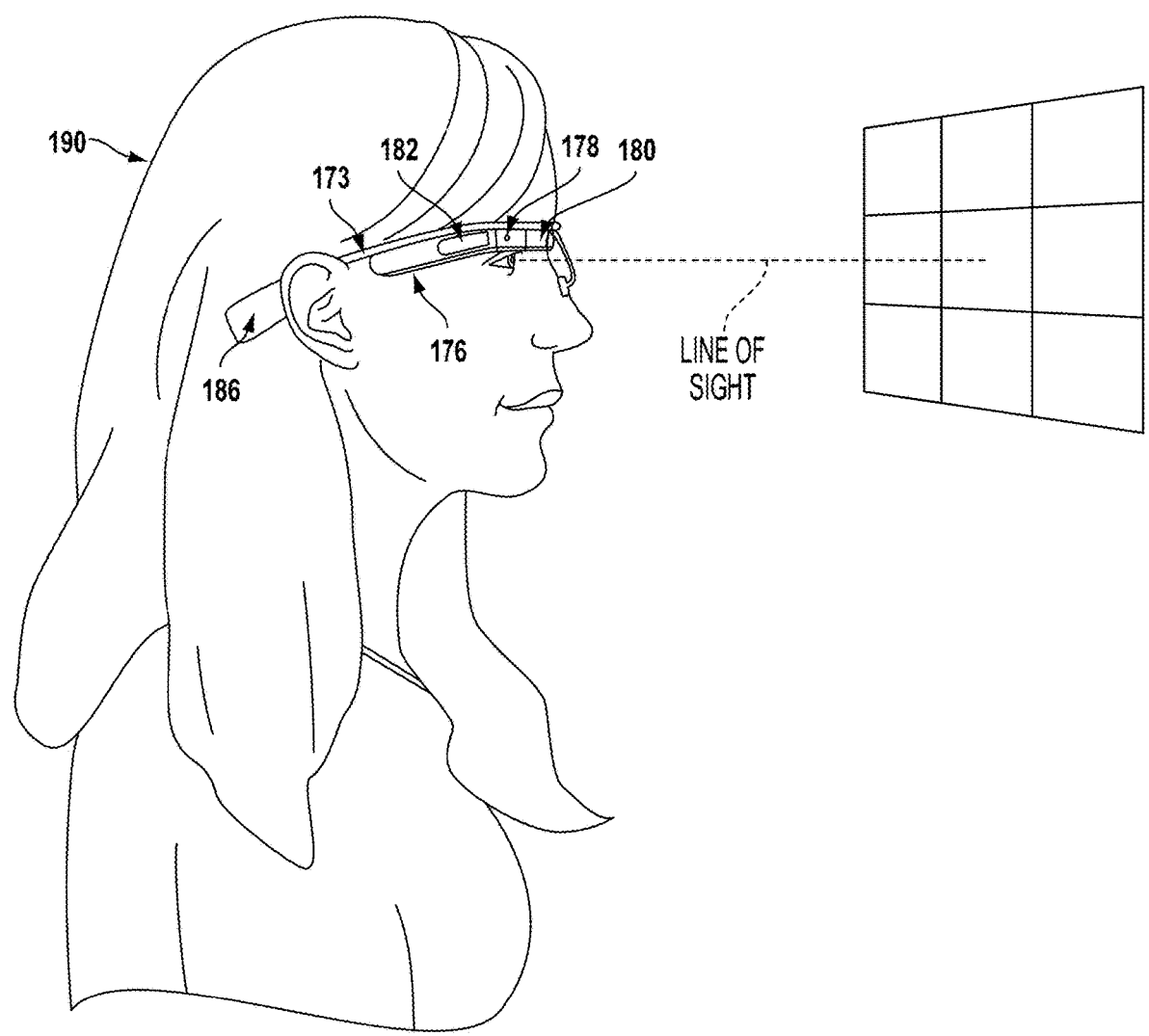
Figure 1G:
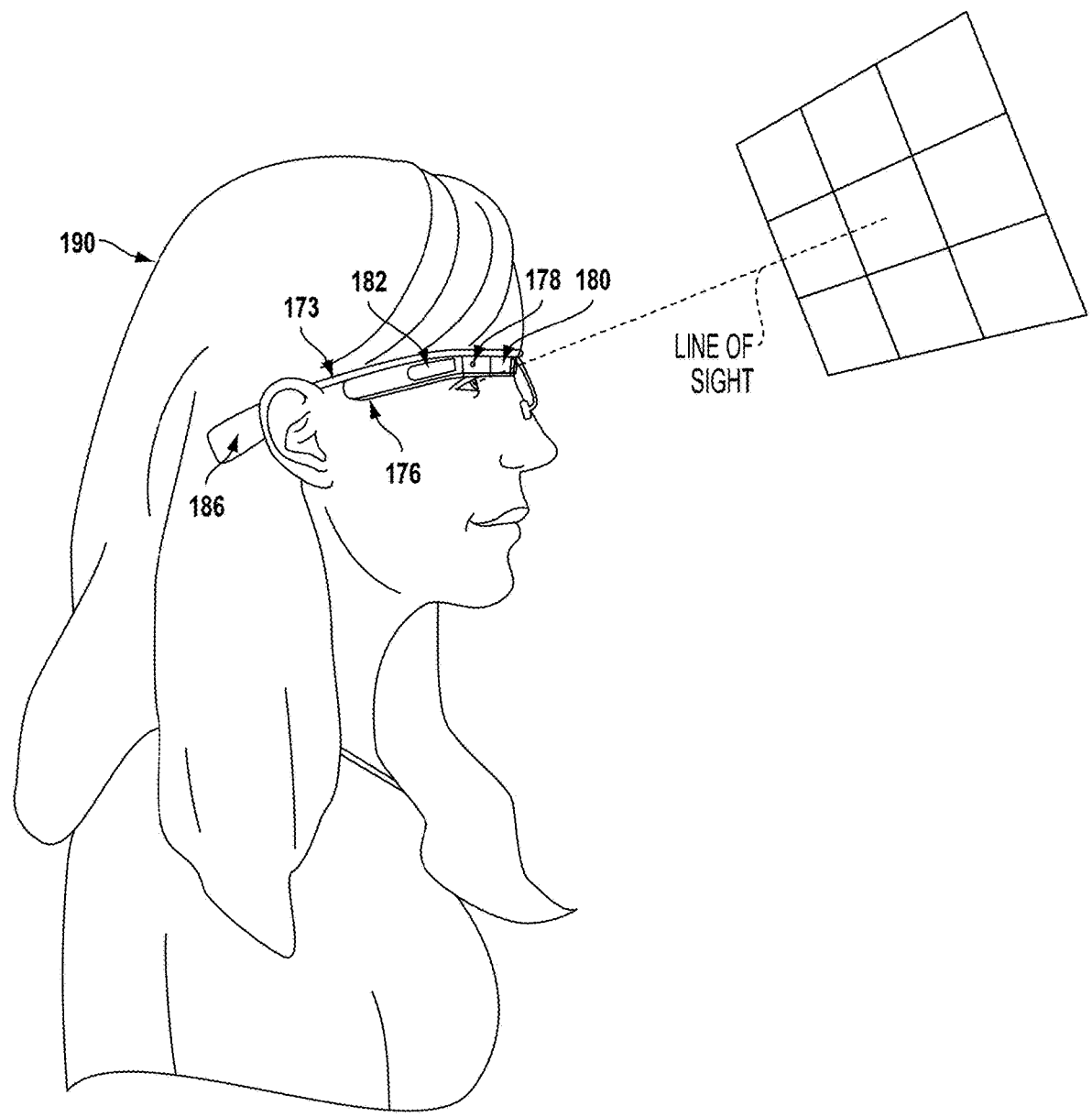

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
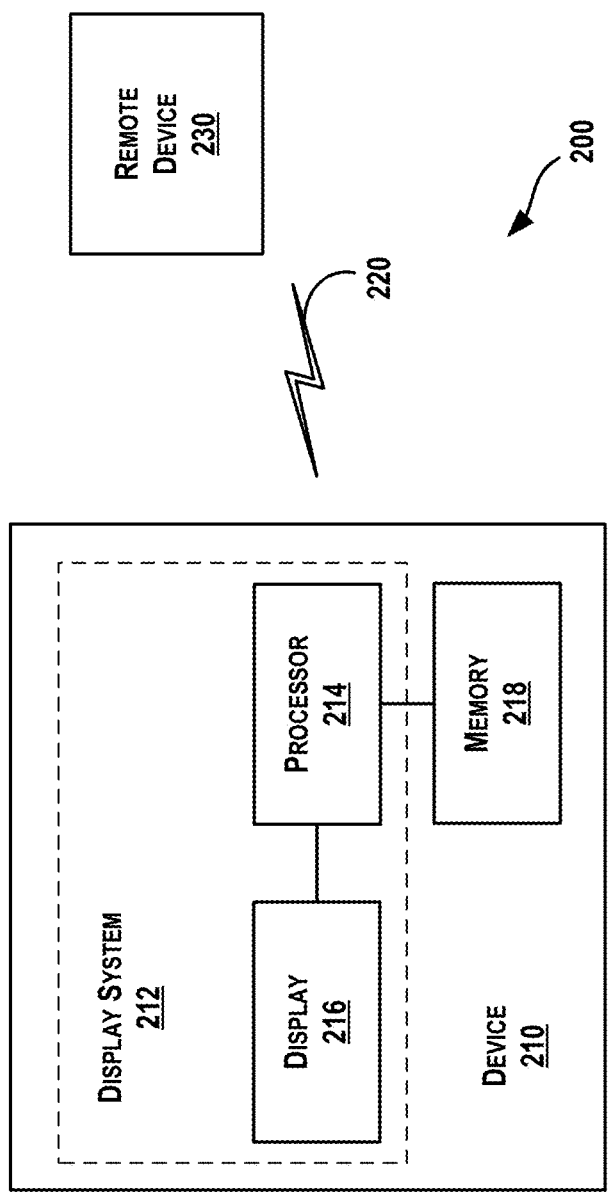
FIG. 2 is a simplified block diagram of a computing device according to example embodiments.

FIG. 2 is a simplified block diagram of a computing device 210 according to an example embodiment. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G. The device 210 could also take the form of other types of wearable devices, such as watch-style (e.g., wrist-mounted) wearable device, or a clip-on device that can be attached to the body or to clothing, among other possibilities.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

In an example embodiment, device 210 communicates using a communication link 220 (e.g., a wired or wireless connection) to a remote device 230. The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. MODULAR HMD ACCESSORY SYSTEMS

Figure 3A:
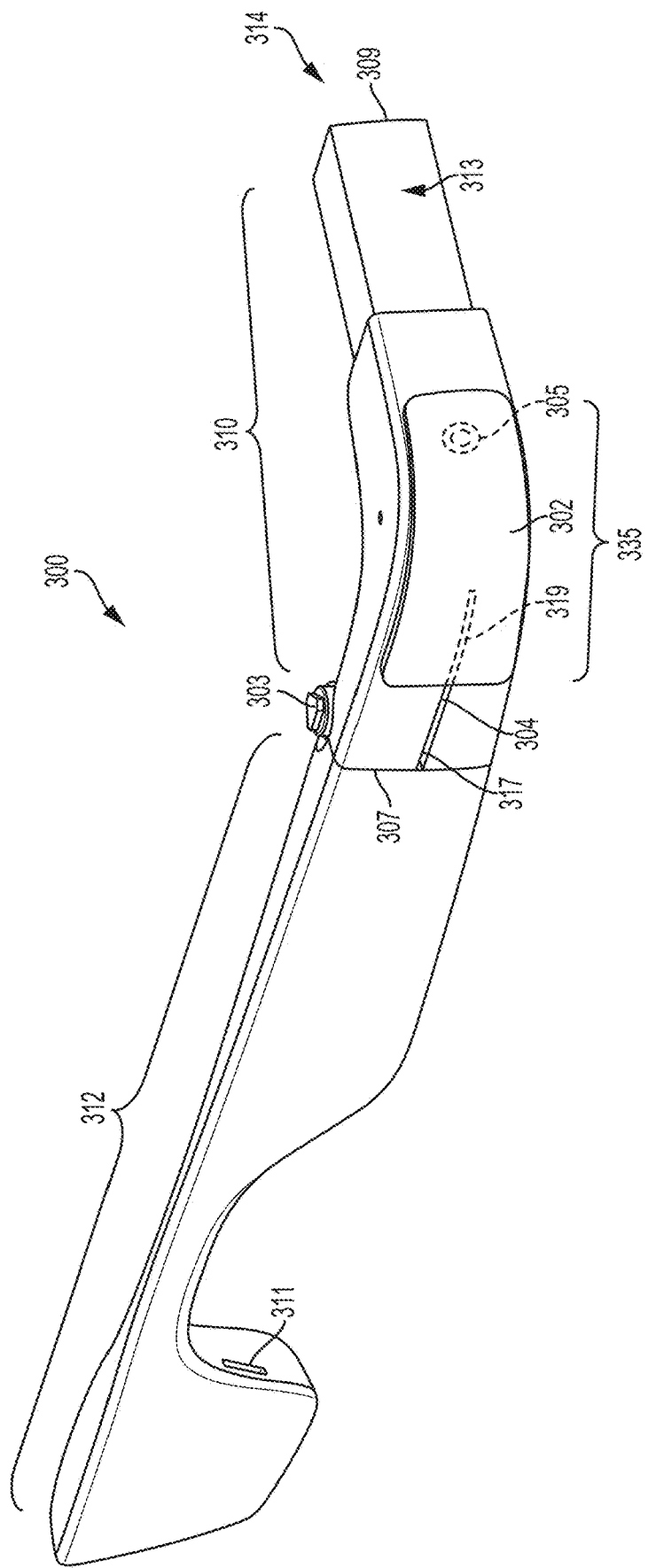
FIGS. 3A to 3C show portions of an wearable-device frame having an accessory slot, according to example embodiments.
Figure 3B:
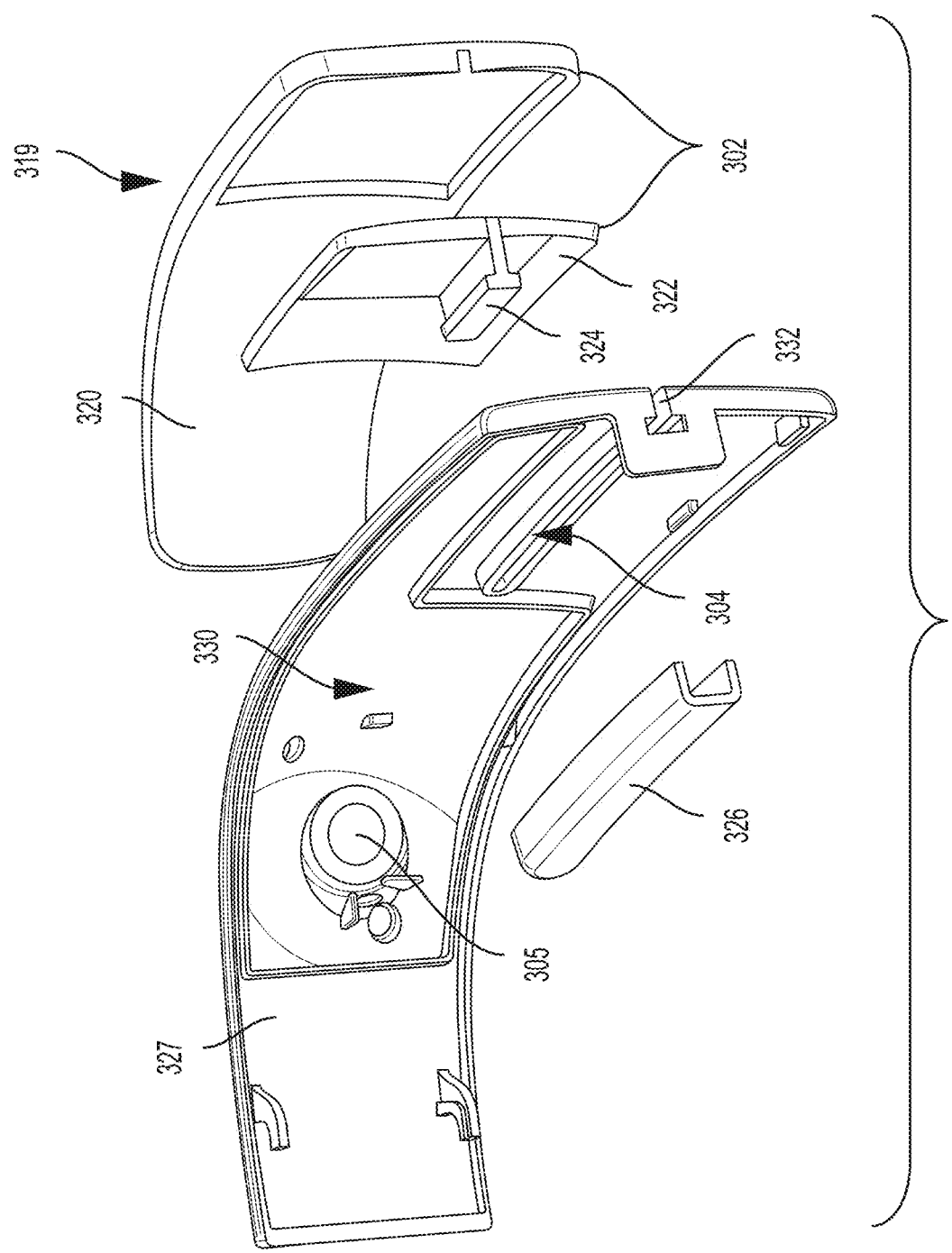
Figure 3C:
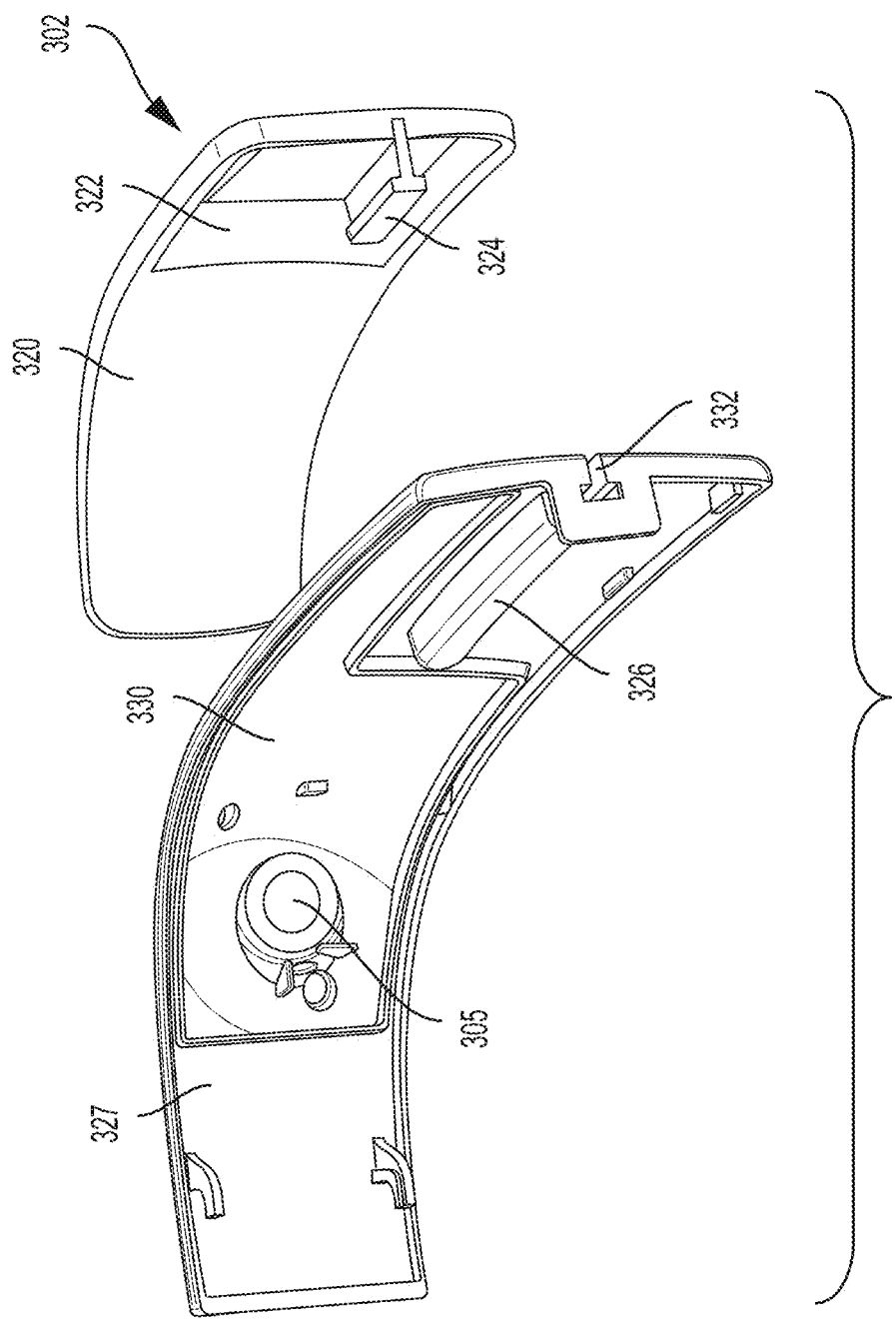

FIGS. 3A to 3C show portions of an HMD frame 300 having an accessory slot 304, according to example embodiments. The HMD frame 300 may be implemented in similar manner to, or as a modification to, an HMD such as those shown in FIGS. 1A to 1G. Other HMD arrangements or variations on the described arrangements are also possible.

Referring now to FIG. 3A, HMD frame 300 includes a first frame component 310 and a second frame component 312, which are movably coupled to one another via a hinge 308. Further, a near-eye display 314 is coupled to the distal end 309 of the first frame component 310. The first frame component 310 may be curved so as to generally follow the curvature of a wearer's face, curving from the temple towards the eye. This curvature allows the first frame component to both connect to the second frame component 312 and position the display 314 near the wearer's eye.

The first frame component 310 includes an accessory slot 304. The accessory slot 304 may be a T-slot or may take another form that allows for accessory devices to be attached to the first frame component. In the illustrated example, a camera cover 302 is coupled to the first frame component 310 via the accessory slot 304, and is positioned such that the camera cover 302 blocks a camera lens 305 arranged in the first frame component 310. (Note that the dotted lines for lens 305 indicate it is positioned behind the camera cover 302). However, a slot-mating feature of the camera cover 302 can slide in the accessory slot 304 towards the posterior end 307 of the first frame component 310, in order to reveal the camera lens 305 and allow the camera to capture images or video of the environment. (Note that the slot-mating feature is not shown in FIG. 3A, but is shown in FIGS. 3B and 3C.)

In the illustrated example, the second frame component 312 takes the form of foldable a side-arm. The second frame component 312 folds about hinge 308 to allow for, e.g., more compact storage of the HMD frame 300. In a further aspect, the second frame component 312 includes a USB-C port 311. Other types of power and/or data interfaces in addition or in the alternative to a USB-C port are also possible.

FIG. 3B is an exploded view 319 of components that could be utilized to provide the first frame component 310 and camera cover 302. As shown, a curved outer component 327 may form the outer surface (e.g., the front) of first frame component 310. The curved outer component 327 can be made from a rigid plastic, metal, or another type of material or combination of materials. The curved outer component 327 includes the camera port 305, which provides a field of view of the environment for a camera lens (not shown in FIG. 3B). The curved outer component 327 also provides the accessory slot 304.

In a further aspect, FIG. 3B shows a slot cover 326, which may be formed from a rigid material, such as a plastic. When the frame 300 is assembled, the slot cover 326 couples to curved outer component 327 such that the slot cover 326 is located inside of the first frame component 310. The slot cover 326 may be physically bonded to the curved outer component 327 using an adhesive, or may permanent bonded using a process to physically fuse the two components together. Alternatively, slot cover 326 may be designed so as to be a "snap-fit" component, which snaps into place over slot cover 326. Slot cover 326 could also be coupled or bonded to the curved outer component 327 in other ways.

In some embodiments, the slot cover 326 can help to provide a waterproof seal between the accessory slot 304 and a cavity 330 surrounding the camera port 305 within the first frame component 310, when coupled to the inner surface of the curved outer component 327. In such embodiments, the combination of the waterproof seal between the accessory slot 304 and the camera cavity 330, combined with a camera lens forming a waterproof seal at lens port 328, to provide a chamber for a camera (and/or other components) that meets certain dust protection, water resistance, and/or waterproofing standards, such as achieving an Ingress Protection (IP) waterproof rating (e.g., IP65 or IP67).

In the illustrated embodiment, the camera cover 302 is formed from a rigid inner component 322 coupled to a flexible outer component 320. Further, the rigid inner component 322 comprises the slot-mating feature 324, which is arranged to slide into the accessory slot of the first frame component 310, so as to movably secure the camera cover 302 to the first frame component 310. FIG. 3C illustrates the rigid inner component 322 and the slot-mating feature 324 coupled together to form the camera cover 302.

More specifically, when inserted in the accessory slot 304, the slot-mating feature 324 is movable in the accessory slot 304 between a first position that extends the flexible outer component 320 to cover the camera port 305, and a second position that exposes the camera port 305. As such, a user can slide the camera cover 302 towards the distal end 309 of the first frame component 310 to cover the camera port 305 (and hide a camera lens arranged therein). And, a user can slide the camera cover 302 towards the posterior end 307 of the first frame component 310 to expose the camera port 305 (and allow a camera disposed therein to capture image data of the environment).

In the illustrated embodiment, the slot-mating feature 324 has a "T" shape, and the accessory slot is a T-slot. This T-slot arrangement is such that insertion of and removal of the T-shaped slot-mating feature 324 is possible via an entry point 332 on a transverse surface of the first frame component 310. (Note that the transverse surface may vary in size, shape, and location on the frame, so long as it is transverse to the surface that the accessory slot runs long; e.g., transverse to the outer surface 313 of the first frame component 310.)

In a further aspect, the accessory slot 304 and slot-mating feature 324 are formed such that the slot-mating feature 324 (and thus the camera cover 302) can only be coupled to or removed from the first frame component via the entry point 332. More specifically, referring to FIG. 3A, the hinge 308 is operable to move the second frame component 312 between a first position in which the second frame component 312 blocks access to the entry point (shown in FIG. 3A), and a second position in which the second frame component 312 allows access to the entry point 332. The first position may be an unfolded position (e.g., where the side-arm(s) of the frame 300 are unfolded so that the HMD can be worn), while the second position may be a folded position (e.g., where the side-arm(s) of the frame 300 are folded against or towards the front section, display, and/or lens(es) of the frame 300, for more compact storage). This arrangement of the first and second frame components 310 and 312, the hinge 308, and the entry point 332 for the accessory slot 304 that is only accessible when the frame 300 is unfolded, can provide for more secure attachment of the camera cover 302 when an HMD is in use (and the frame is unfolded).

Note that while FIGS. 3A to 3C show an example where the accessory slot 304 is a T-slot, and the mating feature 324 on the camera cover 302 has a matching "T" shape, other form factors for the accessory slot and the mating feature on a camera cover or another type of accessory are also possible. Generally, the accessory slot and the slot-mating feature on an accessory device may be shaped such that (i) the slot-mating feature can be inserted into and removed from the accessory slot via an entry point on a surface of the first frame component 310 that is transverse to the surface along which the accessory slot runs, and (ii) once inserted, the slot-mating feature cannot be removed from the first frame component through the surface along which the accessory slot runs (e.g., through the outer surface 313 of the first frame component 310).

In a further aspect, the outer surface 313 of the first frame component 310 has a curvature 335 between the accessory slot 304 and the camera port 305. In the illustrated example, the curvature 335 is formed by the curved outer component 327. This curvature 335 allows the posterior end 307 of the first frame component 310 to movably couple to a side arm of an HMD (e.g., to connect to the second frame component 312 via hinge 308), while the distal end 309 of the first frame component 310 positions the near-eye display 314 in front of the wearer's eye (when the frame 300 is worn). Note that in some embodiments, only a portion or portions of the curved outer component 327 may be curved (and the other portion(s) may be straight). In other embodiments, the entirety of the curved outer component 327 may have a curvature or curvatures. Further, the radius of curvature may vary across different portions of the curved the outer surface 313 of the first frame component 310 (and outer component 327).

In the illustrated example, the flexible outer component 320 has a corresponding curved portion that is shaped to conform to the curvature 335 of the first frame component 310, when the camera cover 302 is positioned to cover the camera port 305. Further, in some embodiments, as the camera cover 302 is being pushed towards the posterior end of the accessory slot 304 (to uncover the camera port), contact with the rigid outer plastic component 327 of the first frame component 310 deforms the corresponding curved portion of the flexible outer component 320 of the camera cover 302, such that radius of the corresponding curved portion increases. As such, the flexible outer component 320 may contact and/or presses against rigid outer plastic component 327 as the camera cover 302 slides along accessory slot 304. Further, the flexible outer component 320 of camera cover 302 may be configured to deform and restore its curvature such that the flexible outer component 320 follows the curvature of the first frame component when the camera cover 302 is located at the posterior end 317 of the accessory slot 304, and also when the camera cover 302 is located at the distal end 319 of the accessory slot 304, even though the corresponding curvature of the first frame component may vary between these locations.

Further, in some embodiments, the flexible outer component 320 can be molded from a low compression-set elastomer such that the flexible outer component 320 substantially maintains conformance to the curvature 335 when deforming stress results thereon from movement of the camera cover 302 to the rear (e.g., posterior end 317) of the accessory slot 304. Further, configured as such, the flexible outer component 320 can return to a smaller-radius curvature, which again follows the curvature 335 of the first frame component 310, when the camera cover 302 is pushed towards the front (e.g., to the distal end 319) of the accessory slot 304 to cover the camera lens. Yet further, in some embodiments, the corresponding curved portion of the flexible outer component 320 may have a curvature with a smaller radius than the corresponding portion of curvature 335, which is opposite the flexible outer component 320 when it is covering the camera port 305. As such, when the user moves the camera cover 302 to the front of accessory slot 304, the flexible outer component 320 may press against or "hug" the outer surface 313 of the first frame component 310.

It should be understood that the camera cover 302 shown in FIGS. 3A to 3C is but one example of an accessory device that could be utilized with an accessory slot according to example embodiments. It should be understood that the described characteristics and/or structural aspects of the camera cover 302 can apply equally to other types of camera covers, and to other types of accessory devices altogether, without departing from the scope of the invention. Examples of other accessory devices, which could be utilized with an accessory slot such as slot 304, are provided below. However, it should be understood that the invention is not limited to the accessory devices described herein. Further, provided with an exemplary HMD frame and accessory slot, such as HMD frame 300, different accessory devices could utilize the same accessory slot, such that a user could swap out different accessory devices in the accessory slot depending on, e.g., their needs and/or the situation.

As one example, a laser scanner could be disposed in a housing that includes or is coupled to a slot-mating feature that is the same as or similar to slot-mating feature 324. Such a laser scanner could be inserted into the accessory slot in the same or a similar manner as described above in reference to camera cover 302. The laser scanner may be utilized to e.g., perform a 3-D scan of the environment surrounding an HMD. The laser scanner may include a USB-C port, which may be connected to the USB-C port 311 on the second frame component 312, such that the laser scanner can be powered by the HMD's battery, and/or can exchange data with and/or receive operating instructions from the HMD. Note that other types of powered accessory devices can exchange data with and/or receive operating instructions from the HMD in the same or a similar manner. Further, it should be understood that accessory devices that utilize other types of power connections, other power sources, and/or other types of data connections, are also possible.

Other examples of accessory devices include, but are not limited to: (a) a flash or video light to provide artificial illumination for image capture via a camera arranged in the camera port (or another camera), (b) a second camera (e.g., to be used in conjunction with a first camera in the camera port to provide stereoscopic imaging), (c) a speaker for playing out audio, and (d) various sensors or combinations of sensors, among other possibilities.

Further, in some embodiments, an accessory device may be configured to serve a dual purpose as a camera cover and an active (e.g., powered) accessory device. For example, a camera cover that is similar in form to camera cover 302 could be attached to or integrated in the housing for a flash, video light, or laser scanner, such that the flash, video light, or laser scanner would also function as a sliding camera cover. Other examples are also possible.

In a further aspect, some embodiments may include accessory slots such as those described herein on both side-arms of an HMD, such that multiple accessory devices could be coupled to the HMD simultaneously. For instance, the configuration with the first frame component and display could be mirrored on the other side of the HMD so that two displays are provided (for both eyes). As such, a second accessory slot configured in the same manner (albeit a mirror image) could be implemented on the other side of the HMD. Other configurations with dual accessory slots are also possible.

In another aspect, the first and second frame components may be movably coupled with hardware other than a hinge. In particular, the first and second frame components could be movably coupled using any sort of attachment mechanism or fastener that provides a foldable structure such that an accessory device can be inserted into and removed from the accessory slot when the frame is folded for storage, and secured by the accessory slot when the frame is unfolded for use.

In a further aspect, the accessory slot may be designed with structural and/or mechanical features that affect the manner in which an accessory coupled thereto slides in the slot. For instance, the slot and/or a mating feature may be designed with fit tolerances to achieve a certain "feel"; e.g., an amount of friction making it easier or more difficult for the user to slide something through the slot. In another aspect, an accessory slot and a mating component on an accessory could include corresponding mechanical and/or structural features such as contact points, notches, bumps, detents, grooves, and/or other structural features, to create desired tactile feedback. For instance, small bumps in a T-slot and corresponding notches in a mating T track of an accessory could be employed to create tactile feedback at certain points along the range of travel. As one example, such features can provide a tactile signal to the user that the accessory is at the limit of travel at either end. Additionally or alternatively, such structural features could be arranged points on the slot other than the ends, e.g., with notches and corresponding detents to provide repeatable positioning of the accessory at certain desired positions along the range of travel in the slot. Other examples are also possible.

Generally, it should be understood that the arrangement shown in FIGS. 3A to 3C is but one possible arrangement of an HMD with an accessory slot. The shape(s), size(s), and proportion(s) of the first frame component and/or the second frame component may vary.

IV. CONCLUSION

It should be understood that the examples herein may be implemented in wearable devices that are not head mountable, such as a watch device, or a body-worn camera, among other possibilities. Further, the examples herein may be implemented in any device having a foldable structure (e.g., a folding mobile phone) such that an accessory slot may be integrated as described herein, so that the slot an accessory device can alternatingly be inserted or secured by folding or unfolding the foldable structure (or vice versa).

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A system comprising:
   a first frame component of a head-wearable device, wherein the first frame component comprises an outer surface having an accessory slot and a camera port, wherein the accessory slot is accessible via an entry point on a transverse surface of the first frame component;
   a second frame component;
   a hinge coupling the first frame component to the second frame component; and
   an accessory device comprising a slot-mating feature shaped for insertion into and removal from the accessory slot via the entry point, wherein the accessory device comprises a camera cover with the slot-mating feature arranged on an inner surface thereof;
   wherein the hinge is operable to move the second frame component between a first position in which the second frame component blocks access to the entry point, and a second position in which the second frame component allows access to the entry point.

2. The system of claim 1, wherein the accessory slot comprises a T-slot.

3. The system of claim 1, wherein the first position is an unfolded position and the second position is a folded position.

4. The system of claim 1, wherein the camera cover comprises a rigid inner component coupled to a flexible outer component, wherein the rigid inner component comprises the slot-mating feature.

5. The system of claim 4, wherein the slot-mating feature, when inserted in the accessory slot, is movable in the accessory slot between a first position that extends the flexible outer component to cover the camera port, and a second position that exposes the camera port.

6. The system of claim 4, wherein the first frame component comprises a curvature between the accessory slot and the camera port, and wherein a corresponding portion of the flexible outer component is shaped to conform to the curvature when the flexible outer component covers the camera port.

7. The system of claim 4, wherein the flexible outer component is molded from a low compression-set elastomer that substantially maintains conformance to the curvature when deforming stress results thereon from movement of the accessory device to reveal the camera port.

8. The system of claim 4, wherein the corresponding portion of the flexible outer component has a curvature with a smaller radius than the curvature of the first frame component.

9. The system of claim 1, wherein the second frame component comprises a side-arm of a head-wearable device.

10. The system of claim 1, further comprising a slot cover coupled to the first frame component and arranged to create a waterproof seal within the accessory slot.

11. The system of claim 1, wherein the accessory device comprises a laser scanner.

12. The system of claim 1, wherein the accessory device comprises a flash.

13. A system comprising:
    a first frame component of a head-wearable device, wherein the first frame component comprises an outer surface having an accessory slot, wherein the accessory slot is accessible via an entry point on a transverse surface of the first frame component, wherein the first frame component comprises a camera housing;
    a second frame component;
    a hinge coupling the first frame component to the second frame component; and
    an accessory device comprising a slot-mating feature shaped for insertion into and removal from the accessory slot via the entry point;
    wherein the hinge is operable to move the second frame component between a first position in which the second frame component blocks access to the entry point, and a second position in which the second frame component allows access to the entry point.

14. The system of claim 13, wherein the first frame component is coupled to a graphic display.

15. A system comprising
    a first frame component of a head-wearable device, wherein the first frame component comprises an outer surface having an accessory slot, wherein the accessory slot is accessible via an entry point on a transverse surface of the first frame component;
    a second frame component;
    a hinge coupling the first frame component to the second frame component;
    a first camera having a lens arranged in a camera port on the outer surface of the first frame component; and
    an accessory device comprising a slot-mating feature shaped for insertion into and removal from the accessory slot via the entry point, wherein the accessory device comprises a second camera;
    wherein the hinge is operable to move the second frame component between a first position in which the second frame component blocks access to the entry point, and a second position in which the second frame component allows access to the entry point.

16. An apparatus comprising:
    a first frame component of a head-wearable device, wherein the first frame component an outer surface having an accessory slot and a camera port, wherein the accessory slot is accessible via an entry point on a transverse surface of the first frame component;
    a second frame component movably coupled to the first frame component;
    wherein the accessory slot is shaped to allow for insertion of a slot-mating feature arranged on an inner surface of an accessory device comprising a camera cover via the entry point on the transverse surface, such that insertion of the slot mating feature movably couples the accessory device to the first frame component;
    wherein the hinge is operable to move the second frame component between a first position in which the second frame component blocks access to the entry point, and a second position in which the second frame component allows access to the entry point.

17. The apparatus of claim 16, further comprising a hinge that movably couples the first frame component to the second frame component.

18. The apparatus of claim 16, wherein the first position is an unfolded position and the second position is a folded position.

\* \* \* \* \*